US006936785B2

(12) United States Patent
Oishi

(10) Patent No.: US 6,936,785 B2
(45) Date of Patent: Aug. 30, 2005

(54) WELDING CONSTRUCTION AND A WELDING METHOD USING THE SAME

(75) Inventor: Akinori Oishi, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 95 days.

(21) Appl. No.: 10/461,231

(22) Filed: Jun. 13, 2003

(65) Prior Publication Data

US 2004/0004059 A1 Jan. 8, 2004

(30) Foreign Application Priority Data

Jul. 4, 2002 (JP) ....................................... 2002-196482

(51) Int. Cl.[7] ................................................ B23K 11/14
(52) U.S. Cl. .................................. 219/56.22; 219/56.21
(58) Field of Search ........................... 219/56.22, 56.21, 219/56.1

(56) References Cited

U.S. PATENT DOCUMENTS 5,057,661 A * 10/1991 Banner .................... 219/56.22
5,541,365 A 7/1996 Sugiura et al.
5,739,496 A * 4/1998 Asakura et al. .......... 219/56.22
6,064,026 A * 5/2000 Tkazyik et al. .......... 219/56.22
6,643,926 B2 * 11/2003 Sakaguchi et al. ............ 29/863

* cited by examiner

*Primary Examiner*—Len Tran
(74) *Attorney, Agent, or Firm*—Gerald E. Hespos; Anthony J. Casella

(57) ABSTRACT

A welding construction (10) includes a weldable portion (11*a*) formed by bending a leading end of an electrically conductive plate (11). This weldable portion (11*a*) is formed with a tip (11*c*). Further, a slit (11*d*) is formed to extend from a left slanted edge (11*b*) toward a widthwise center of the weldable portion (11*a*), and a lead (12*a*) is accommodated in the slit (11*d*). A meltable portion (11*e*) is provided between the slit (11*d*) and the leading end of the weldable portion (11*a*) including a tip (11*c*). When an electrode (D) of an arc welding machine discharges arcs toward the leading end of the weldable portion (11*a*), these arcs are created toward the tip (11*c*) to melt the weldable portion (11*e*) and connect the lead (12*a*) and the weldable portion (11*a*).

9 Claims, 7 Drawing Sheets

WELDING CONSTRUCTION AND A WELDING METHOD USING THE SAME

BACKGROUND OF THE INVENTION

1. Field of the Invention

The invention relates to a welding construction for an electrically conductive plate to arc-weld a lead portion of a device, such as an electric or electronic device, and a welding method using the same.

2. Description of the Related Art

An electronic device used in a circuit of an electrical part generally has a lead for connection with an electrically conductive plate, such as a busbar, of the circuit. This connection conventionally has been made by welding connection points of the lead and the plate. More particularly, the lead of the electronic device and the electrically conductive plate are connected electrically by melting a part of the electrically conductive plate to coat the leading portion and fixing the lead to the electrically conductive plate.

U.S. Pat. No. 5,541,365 discloses a beam-weldable terminal construction of an electrically conductive plate that is suitable for welding as described above.

FIGS. 7A and 7B are perspective views showing a known beam-weldable terminal 1 with a part thereof left out, wherein FIG. 7(A) shows a state before welding and FIG. 7(B) shows a state after welding.

With reference to FIG. 7(A), the beam-weldable terminal 1 includes a bottom wall 2 and two holding walls 3 that extend from the opposite lateral sides of the bottom wall 2. A wire accommodating portion 5 is defined by the bottom wall 2 and the holding walls 3 for accommodating a wire 4. The depth from the upper surface of the bottom wall 2 to the upper edges of the holding walls 3 of the wire accommodating portion 5 substantially equals the diameter of the wire 4. Thus, the wire 4 can be held tightly between the holding walls 3 and placed on the bottom wall 2 without being exposed upward. A projection 3*a* extends up from the upper edge of one holding wall 3 and is narrower than the holding wall 3. The wire 4 is accommodated in the wire accommodating portion 5 of the beam-weldable terminal 1, and a laser beam is projected onto the bottom of the projecting portion 3*a* as indicated by an arrow Y1.

With reference to FIG. 7(B), the laser beam creates heat energy at a touching portion between the wire 4 and the holding wall 3. Thus, a coupling portion of the projection 3*a* and the holding wall 3 and a portion near it are melted. As a result, the projection 3*a* deforms toward the wire 4 and melts to coat the wire 4. The beam-weldable terminal 1 and the wire 4 are connected electrically by coating the wire 4 with the projection 3*a*, and the projection 3*a* subsequently solidifies. Thus, the solidified projection 3*a* fixes the wire 4 to the beam-weldable terminal 1.

A laser welding machine is required to project a laser beam onto the welding point to weld the lead and the electrically conductive plate of the beam-weldable terminal 1 to each other. The laser welding machine of this type is very expensive. Additionally, many kinds of welding steps often must be performed in parallel, and it is necessary to prepare the laser welding machine for each welding step. This leads to a huge investment in equipment. Therefore, there has been a demand to connect an electronic device and an electrically conductive plate by arc-welding using a less expensive arc welding machine.

An arc welding machine can melt an electrically conductive plate by bringing an electrode of the arc welding machine close to the electrically conductive plate that is to be welded. Arcs are created between the electrically conductive plate and the electrode and the arcs produce heat energy in the electrically conductive plate. The electronic device and the electrically conductive plate are connected by melting the electrically conductive plate in this way.

FIG. 8 illustrates a problem that occurs when attempting to connect the aforementioned beam-weldable terminal 1 and the wire 4 by arc welding. In particular, arcs created from the electrode of the arc welding machine tend to be directed toward closer parts of the electrically conductive plate, unlike the aforementioned laser beam. Thus, even if an attempt is made to create arcs at a position indicated by the arrow Y1 in FIG. 7(A), the arcs may be created at irregular positions of the beam-weldable terminal 1.

For example, arcs may be created at the upper ends of the projection 3*a* as indicated by arrows Y2, Y3. In such a case, the projection 3*a* melted by the arcs may deform toward a side opposite from the wire 4 and outside of the wire accommodating portion 5. As a result, the wire 4 may not be coated and may not be connected properly with the terminal 1. Further, even if the molten projection 3*a* is deformed toward the wire 4, the molten state of the projection 3*a* and the coated state of the wire 4 differ depending on whether arcs are created as indicated by the arrow Y2 or Y3. Thus, connection strength of the terminal 1 and the wire 4 may differ.

Arcs could be created to reach the wire 4, as indicated by an arrow Y4. Thus, the projection 3*a* has to be melted by the transfer of the heat energy of the arcs to the terminal 1. However, the heat transfer takes time. Additionally, heat energy applied in this manner may make the connection between the terminal construction 1 and the wire 4 unstable and may damage the wire 4.

Connection of the terminal 1 and the wire 4 by arc welding is unstable and has no reproducibility. Furthermore, the wire 4 may be damaged since the arcs are created unstably at positions indicated by the arrows Y2 to Y4.

The invention was developed in view of the above problems and an object thereof is to provide a welding construction that causes arcs to be created stably at a desired position and that connects an electric or electronic device and an electrically conductive plate with reproducibility by arc welding without damaging the device and a welding method using such a welding construction.

SUMMARY OF THE INVENTION

The invention relates to a welding method for arc-welding a lead of a device to an electrically conductive plate. The method comprises providing a welding construction having one or more slanted or bent edges formed to narrow a leading end of the electrically conductive plate along a widthwise direction and to taper the leading end. A tip is formed at the electrically conductive plate by the slanted edges and a slit is formed to extend to or beyond a widthwise center of the electrically conductive plate. The slit is adapted to accommodate the lead. A meltable portion is provided between the slit and the leading end of the electrically conductive plate including the tip and has a volume or geometric dimension necessary to substantially close an opening of the slit. The method then comprises performing a welding step so that arcs are created at the leading end of the electrically conductive plate to melt the meltable portion. Thus, a molten material of the meltable portion is filled into the slit.

The welding construction comprises the tip, the meltable portion and the slit in this order from the leading end of the electrically conductive plate.

Arc welding applied to the welding construction, creates arcs toward the leading end portion. The arcs having a tendency to be directed toward the closely located electrically conductive plate, as described above, and are directed toward the tip defined by slanted edges. Heat energy is created when the arcs reach the tip to melt the meltable portion. The meltable portion and the slit are next to each other in the electrically conductive plate. Thus, the molten material of the meltable portion fills the slit to substantially coat, cover or surround the lead in the slit. The lead coated with the molten material of the meltable portion is connected electrically with the electrically conductive plate and fixed to the electrically conductive plate.

As described above, the arcs advantageously can be created stably at the tip by applying the welding step to the welding construction. Thus, the electronic device and the electrically conductive plate can be welded without creating arcs at the electronic device, thereby preventing the electronic device from being damaged, and can be welded with reproducibility.

The welding construction preferably has two slanted edges that intersect at the tip.

The slit preferably extends from one slanted edge toward or beyond a widthwise center of the electrically conductive plate.

The lead portion preferably is arranged in the slit substantially to or beyond an imaginary line extending substantially vertically from the tip along the leading end of the electrically conductive plate.

The arc-welding step preferably comprises a step of arranging an electrode within a proper range, which preferably is a substantially pentagonal area defined by a first side connecting a reference point located about 0.2 mm right and about 0.2 mm up from the tip and a position about 0.5 mm right and about 0.5 mm down from the reference point, a second side connecting the bottom end of the first side and a position about 0.1 mm right and about 0.5 mm up from the bottom end of the first side, a third side connecting the upper end of the second side and a position about 0.6 mm up from the upper end of the second side, a fourth side connecting the upper end of the third side and a position about 0.6 mm left from the upper end of the third side, and a fifth side connecting the left end of the fourth side and the reference point. The electrode is permitted to make movement errors within a range of at minimum about ±0.2 mm along longitudinal and/or transverse directions with respect to the proper range.

The invention also relates to a welding construction of an electrically conductive plate to be arc-welded to a lead of a device. The welding construction comprises one or more slanted or bent edges formed to narrow or taper a leading end of the electrically conductive plate along the widthwise direction. The slanted edges define a tip on the electrically conductive plate. A slit extends toward or beyond a widthwise center of the electrically conductive plate and is dimensioned to accommodate the lead. A meltable portion is defined between the slit and the leading end of the electrically conductive plate including the tip and has a volume necessary to substantially close an opening of the slit.

The tip preferably is formed at the intersection of the slanted edges.

The slit preferably is formed to extend from one slanted edge toward or beyond a widthwise center of the electrically conductive plate.

The tip is at the leading end of the electrically conductive plate. Thus, the arcs created toward the leading end of the electrically conductive plate can be directed toward the tip. The arcs directed toward the tip portion create heat energy at the tip to melt the meltable portion. As described above, the meltable portion and the slit are provided next to each other in the electrically conductive plate. Thus, the molten material of the meltable portion fills into the slit and coats the lead in the slit, thereby connecting the electrically conductive plate and the lead.

As described above, the welding construction cause arcs to be created stably at the tip. Thus the electronic device will not be damaged and the electronic device and the electrically conductive plate can be welded with reproducibility.

The slit preferably is formed s that a center of gravity of a cross-section of the lead accommodated in the slit along a plane including the respective slanted portions is near or on a straight line extending vertically from the tip. Thus, the material of the meltable portion molten by the arcs moves vertically down toward the lead by the action of gravity and the molten material can more rapidly fill the slit and coat the lead, thereby effectively applying arc welding.

These and other objects, features and advantages of the present invention will become more apparent upon reading of the following detailed description of preferred embodiments and accompanying drawings. It should be understood that even though embodiments are separately described, single features thereof may be combined to additional embodiments.

BRIEF DESCRIPTION OF THE DRAWINGS

FIGS. 2(A), 2(B) and 2(C) are front views showing states during a step of applying welding to the welding construction of FIG. 1, wherein FIG. 2(A) shows a state where arcs are being created, FIG. 2(B) shows a state where a meltable portion has started being molten, and FIG. 2(C) shows a state where the welding step is completed.

FIGS. 3(A), 3(B) and 3(C) are diagrams showing a proper range of the position of an electrode with respect to the welding construction of FIG. 1, wherein FIG. 3(A) shows the proper range corresponding to the front view of the welding construction, FIG. 3(B) shows the proper range corresponding to the right side view of the welding construction, and FIG. 3(C) show the proper range corresponding to a perspective view of the welding construction.

FIGS. 4(A) and 4(B) are front views showing a welding construction according to a second embodiment of the present invention, wherein FIG. 4(A) shows a state before welding and FIG. 4(B) shows a state after welding.

FIGS. 5(A) and 5(B) are front views showing a welding construction according to a third embodiment of the present invention, wherein FIG. 5(A) shows a state before welding and FIG. 5(B) shows a state after welding.

FIGS. 6(A) and 6(B) are front views showing a further preferred embodiment of a welding construction with a part thereof left out, wherein FIG. 6(A) shows a state before welding and FIG. 6(B) shows a state after welding.

FIGS. 6(C) and 6(D) are front views showing two modifications of the preferred embodiment.

FIGS. 7(A) and 7(B) are perspective views showing a prior art beam-weldable terminal construction with a part thereof left out, wherein FIG. 7(A) shows a state before welding and FIG. 7(B) shows a state after welding.

DETAILED DESCRIPTION OF THE PREFERRED EMBODIMENTS

Figure 1:
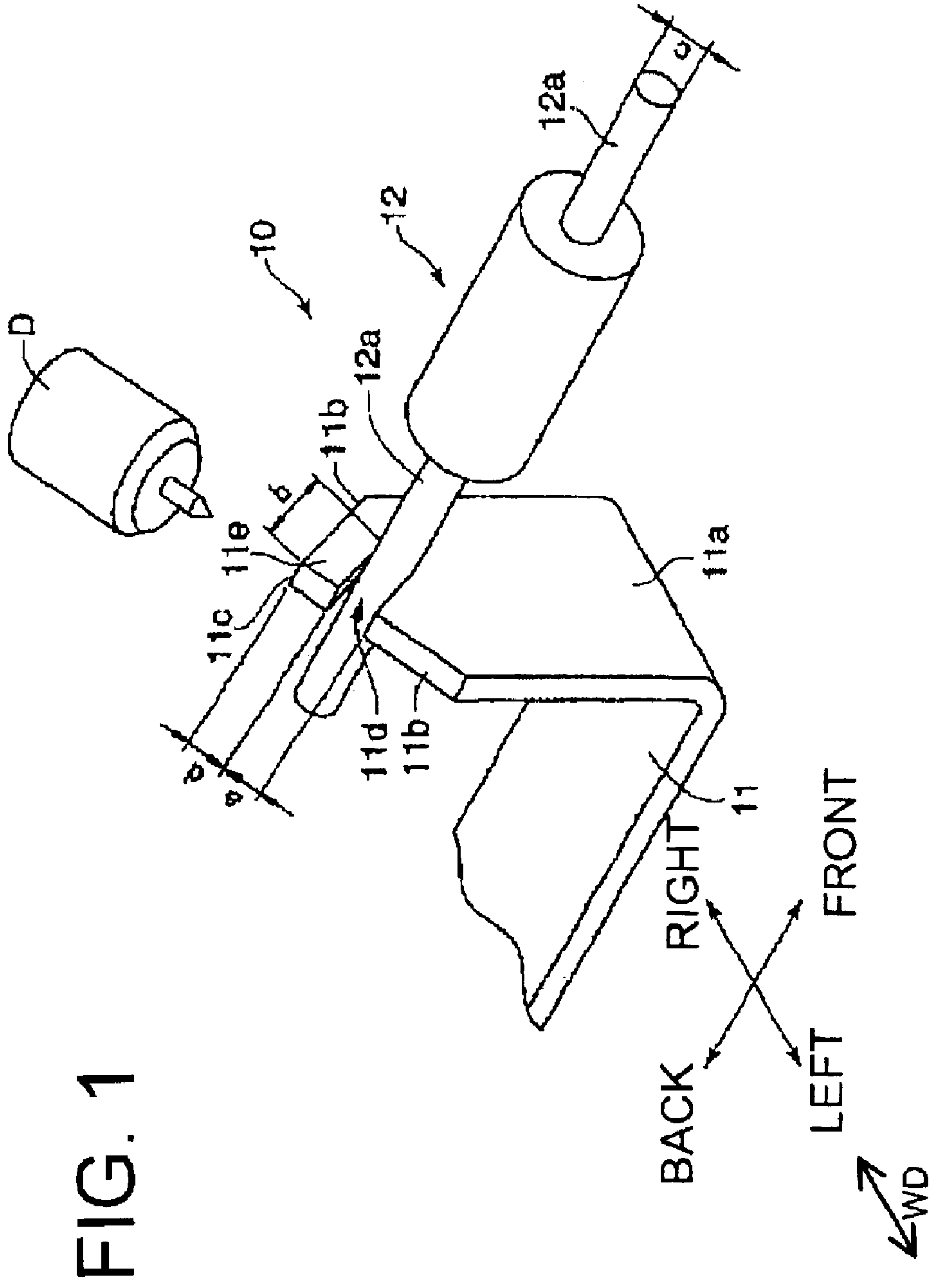
FIG. 1 is a perspective view showing a welding construction according to a first embodiment of the invention with a part thereof left out.

A welding construction 10 according to a first preferred embodiment of the present invention is identified by the numeral 10 in FIG. 1. The welding construction 10 includes a strip-shaped electrically conductive plate 11 for forming a circuit. A weldable portion 11*a* is formed by bending the leading end portion of the electrically conductive plate 11 at an angle of substantially by 90° with respect to a base portion. In the following description, the end of the electrically conductive plate 11 with the weldable portion 11*a* stands is referred to as the front and reference is made to left and right sides when viewed from the front.

Figure 2C:
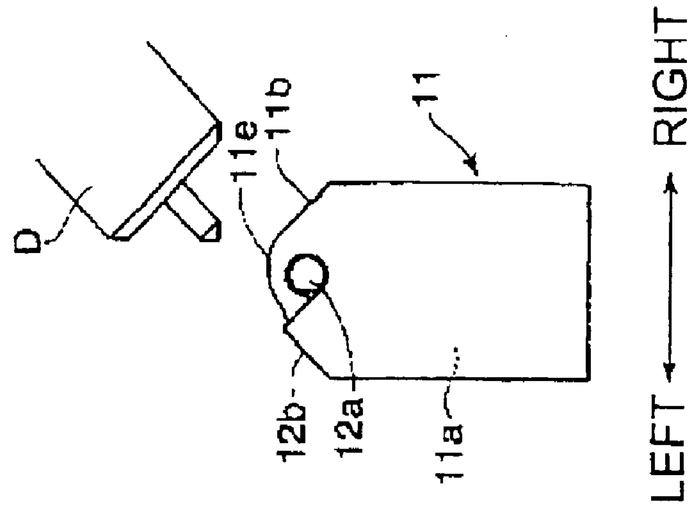

Two slanted edges 11*b* are provided at the leading end of the weldable portion 11*a* so that the leading end of the weldable portion 11*a* is tapered with respect to a widthwise direction WD. The slanted edges 11*b* extend in at about 45° from substantially the same height of the weldable portion 11*a*, as shown in FIG. 2(A), and intersect to define a tip 11*c* at the leading end of the weldable portion 11*a*. As a result, the tip 11*c* is substantially in the widthwise center of the weldable portion 11*a* and the slanted edges 11*b* intersect at substantially right angles at the tip 11*c*.

A slit 11*d* is formed in the weldable portion 11*a* and extends from the left slanted edge 11*b* substantially toward the widthwise center of the weldable portion 11*a*. The slit 11*d* penetrates entirely through the thickness of the weldable portion 11*a*, and extends substantially normal to the left slanted portion 11*b* in front view. The slit 11*d* can accommodate a lead 12*a* of a fuse 12 or a corresponding lead of some other electric/electronic device while orienting the lead substantially along forward and backward directions. The lead 12*a* substantially cylindrical and is electrically conductive. The slit 11*d* has a depth set such that the central axis of the lead 12*a* accommodated in the slit 11*d* is on a straight line L extending substantially extending vertically from the tip 11*c* (see FIG. 2(A)).

A meltable portion 11*e* is provided between the slit 11*d* and the leading end of the weldable portion 11*a* including the tip 11*c*. The meltable portion 11*e* is set to have a volume and geometric dimension sufficient to coat and surround the lead 12*a* with the molten material after welding and to fix the lead 12*a* to the weldable portion 11*a* with a desired strength. Specifically, in this embodiment, the lead 12*a* has a diameter of about 0.63 mm, while the slit 11*d* has a width "a" of about 0.75 mm and a depth "b" of about 1.2 mm. Additionally, the meltable portion 11*e* is set to have a width "d" of about 0.5 mm to coat and surround the lead 12*a* and to fix the lead 12*a* to the weldable portion 11*a*.

With reference to FIG. 2(A), an electrode D of an unillustrated arc welding machine is brought close to the weldable portion 11*a* from above the right slanted portion 11*b*, which is the slanted portion 11*b* on which the slit 11*d* is not provided. Arcs discharged from the electrode D tend to be directed toward the closest electrically conductive portion and/or where the electric field lines are more concentrated. Thus, arcs are directed toward the tip 11*c* which is a most upward projecting portion of the weldable portion 11*a*.

Figure 2B:
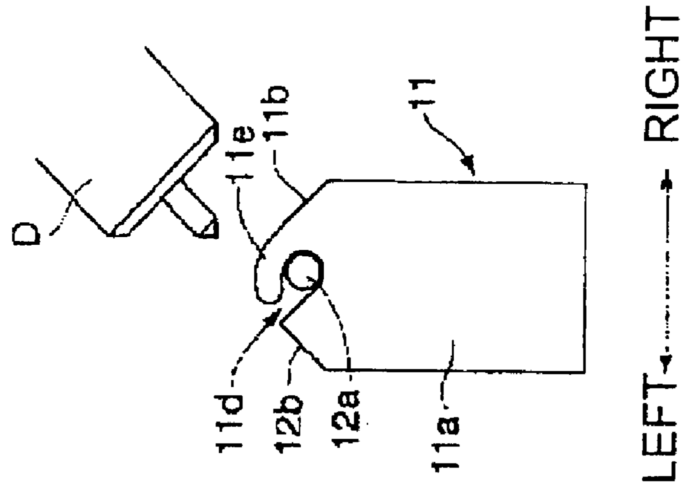
Figure 2A:
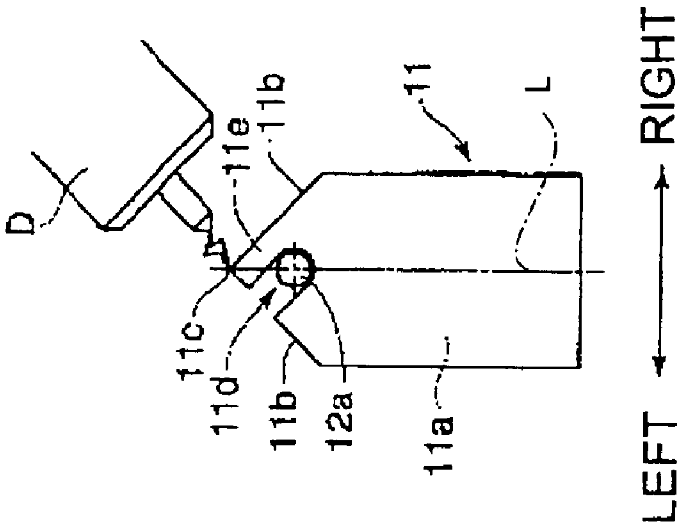

With reference to FIG. 2(B), heat energy is created by the arcs substantially at or near the tip 11*c* where the arcs were created by the electrode D, and the meltable portion 11*e* including the tip 11*c* starts being molten. The molten meltable portion 11*e* is melted further by the heat energy and deforms toward the opening of the slit 11*d* by the action of gravity.

With reference to FIG. 2(C), the material of the molten meltable portion 11*e* substantially coats and surrounds the lead 12*a* and fills the slit 11*d*. In this way, the material of the molten meltable portion 11*e* is connected electrically with the lead 12*a*. The meltable portion 11*e* then solidifies to fix the lead 12*a* and the weldable portion 11*a*.

As described above, the arcs are directed toward the tip 11*c* by bringing the electrode D close to the weldable portion 11*a* substantially from above and to the right of the slanted portion 11*b*, which is the slanted portion 11*b* on which the slit 11*d* is not provided. Here, there exists a proper range T of such a position of the electrode D where the arcs can be directed substantially toward the tip 11*c* as much as possible. This proper range T changes depending on the shape of the weldable portion 11*a*.

Figures 3A, 3B, 3C:
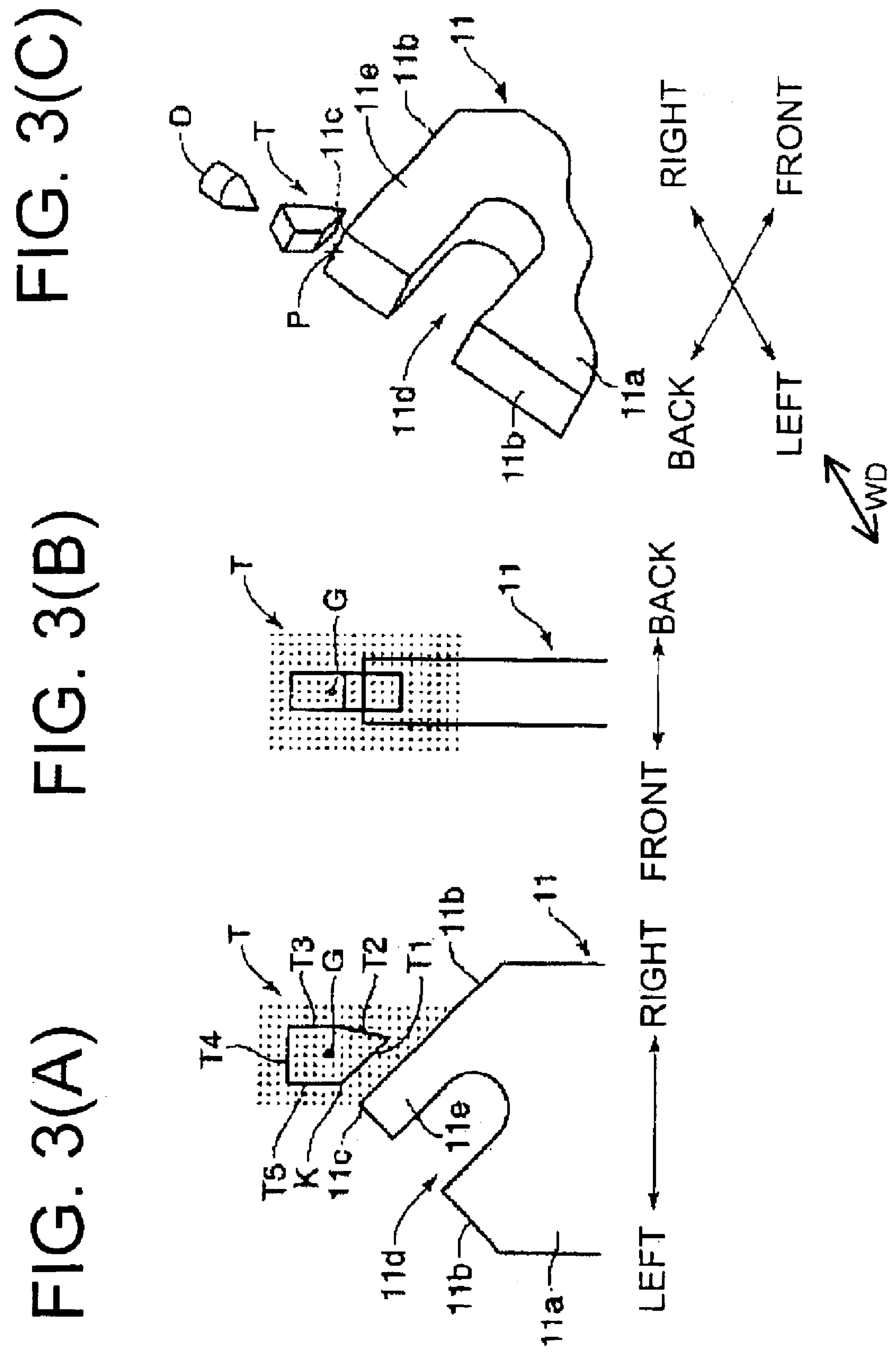

With reference to FIG. 3(A), the proper range T is a substantially pentagonal area defined by a side T1 connecting a reference point K located about 0.2 mm to the right and about 0.2 mm to up from the tip 11*c* and a position about 0.5 mm to the right and about 0.5 mm to down from the reference point K, a side T2 connecting the bottom end of the side T1 and a position about 0.1 mm to the right and about 0.5 mm to up from the bottom end of the side T1, a side T3 connecting the upper end of the side T2 and a position about 0.6 mm up from the upper end of the side T2, a side T4 connecting the upper end of the side T3 and a position about 0.6 mm to the left from the upper end of the side T3, and a side T5 connecting the left end of the side T4 and the reference point K. Dots are shown in FIGS. 3(A) and 3(B) such that intervals therebetween indicate about 0.1 mm. Further, a dimension of the proper range T along forward and backward directions is about 0.4 mm as shown in FIG. 3(B).

The proper range T is a range of the position of the electrode D in the case that the welding steps are carried out while changing the position near the weldable portion 11*a* to which the electrode D is brought every time and arcs are created at a center position P of the tip 11*c* with respect to forward and backward directions as shown in FIG. 3(C). Thus, the arcs created from the electrode D reliably reach the tip 11*c* by positioning the electrode D within the proper range T.

The electrode D preferably is positioned at a center of gravity position G of the proper range T, as shown in FIGS. 3(A) and 3(B). The electrode D at the center of gravity position G of the proper range T is permitted to make movement errors within a range of at minimum about ±0.2 mm along forward and backward directions and transverse direction (i.e. a range having a thickness of about 0.4 mm is the minimum of the proper range T). Known arc welding machines can position the electrode D within an error range of about ±0.2 mm. Thus, the welding construction 10 can securely direct the arcs toward the tip 11*c*.

As described above, the welding construction 10 has the leading end of the welding portion 11*a* tapered by the slanted portions 11*b*, and the lead 12*a* is accommodated in the slit 11*d* formed to extend toward the center of the weldable portion 11*a* from one slanted portion 11*b*. Further, the tip 11*c* is formed at the leading end of the weldable portion 11*a* by the intersection of the respective slanted portions 11*b*, and arcs are created at or near the tip 11*c* to melt or weld the meltable portion 11*e* by bringing the electrode D of the arc welding machine close to the tip 11*c*. The molten material of the meltable portion 11*e* coats the lead 12*a*, fills in the slit 11*d* and connects the lead 12*a* and the weldable portion 11*a*.

The welding construction 10 can cause arcs to be created reliably at the tip 11*c*. Therefore, the welding construction can be arc-welded to the lead 12*a* without damaging the electronic device, such as the fuse 12.

Figure 4A:
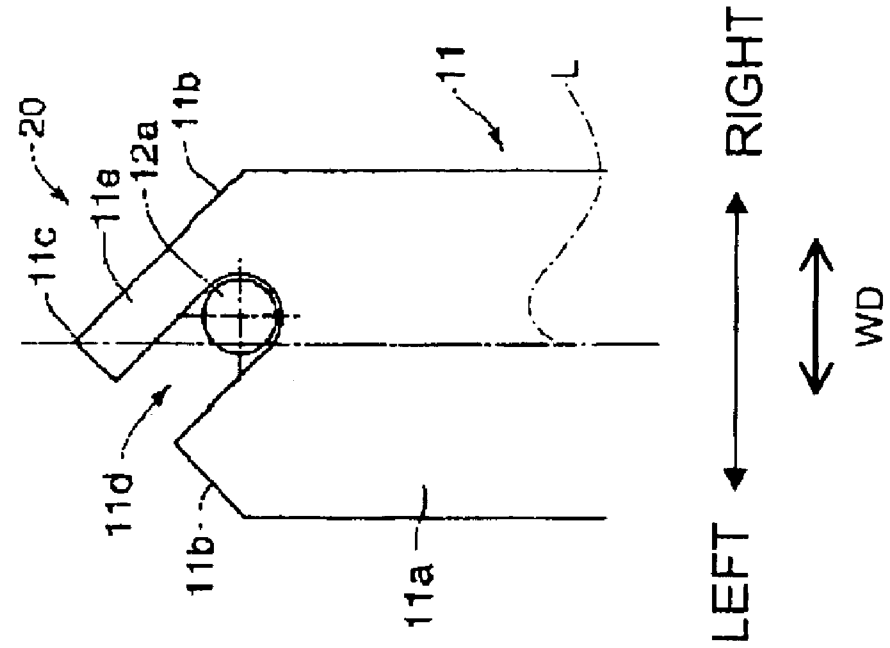
Figure 4B:
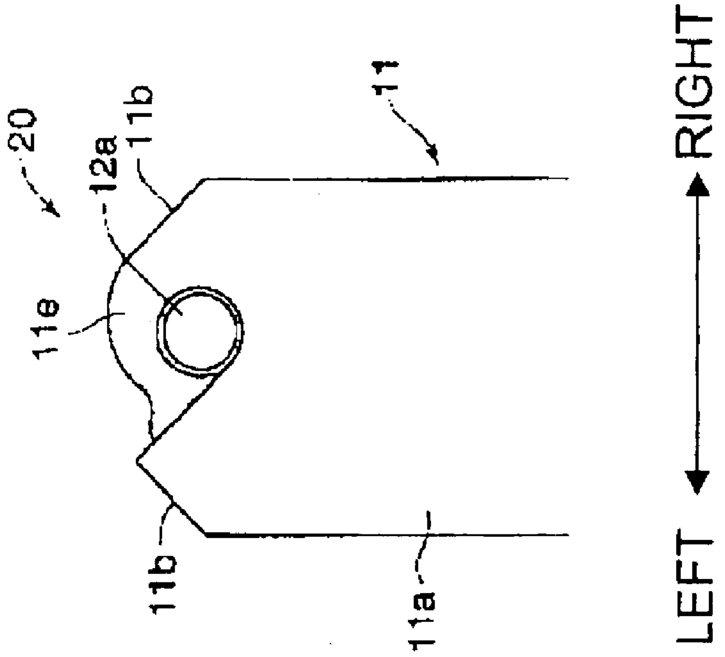

FIGS. 4(A) and 4(B) show a welding construction 20 according to a second embodiment of the invention. The welding construction 20 is similar to the welding construction 10, and similar elements are identified by the same reference numerals without being described again. With reference to FIG. 4(A), the welding construction 20 has a slit 11*d* set such that the substantially circular cross-section of a lead 12*a* accommodated in the slit 11*d* is displaced slightly laterally to the right from a straight line L that extends vertically from a tip 11*c*. More particularly, the center of the substantially circular cross section of the lead 12*a* is deeper in the slit 11*d* than the line L. Further, a meltable portion 11*e* of the welding construction 20 is set to have a volume or geometric dimension sufficient to substantially close an opening of the slit 11*d* similar to the first embodiment. The welding construction 20 also can cause arcs to be created at or near the tip 11*c* for melting the meltable portion 11*e* by positioning an electrode (not shown) of an arc welding machine within a proper range T.

With reference to FIG. 4(B), the molten material of the meltable portion 11*e* coats and surrounds the lead 12*a* and fills the slit 11*d* to electrically connect the lead 12*a* and the weldable portion 11*a*. Thus, the molten material of the meltable portion 11*e* fixes the lead 12*a* to the weldable portion 11*a*.

In this way, the lead 12*a* can be arc-welded to the weldable portion 11*a* as in the welding construction 10 even though the center of the lead 12*a* is displaced slightly from the straight line L that extends vertically from the tip 11*c*.

Figure 5A:
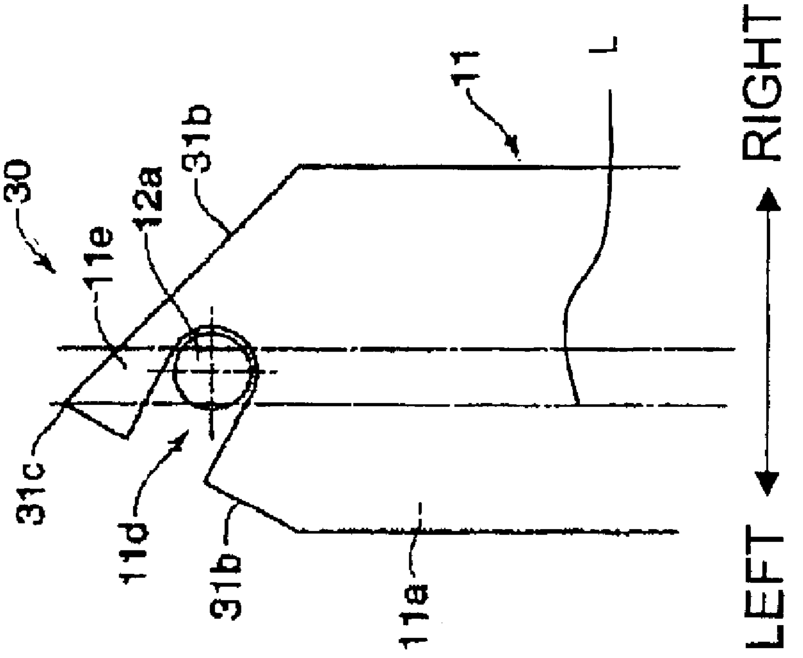
Figure 5B:
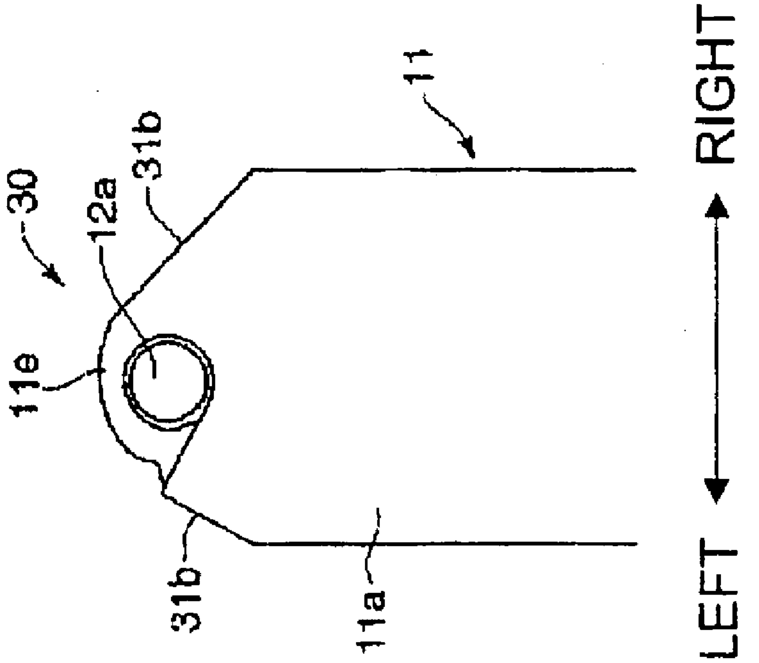

A welding construction 30 according to a third embodiment is identified by the numeral 30 in FIGS. 5(A) and 5(B). With reference to FIG. 5(A), the welding construction 30 has two slanted portions 31*b* that extend in at different angles from the substantially the same height position of a weldable portion 11*a*. As a result, the respective slanted portions 31*b* intersect at a position displaced laterally to left from the widthwise center of the weldable portion 11*a*, and a tip 31*c* is formed at this position. The depth of the slit 11*d* is set such that the center of a circular cross section of the lead 12*a* is displaced slightly to the right from a straight line L extending substantially vertically from the tip 31*c*. Furthermore, a meltable portion 11*e* of the welding construction 30 has a geometric dimension sufficient to close an opening of the slit 11*d* similar to the above embodiments. Such a welding construction 30 also can cause arcs to be created at the tip 31*c* and melt or weld the meltable portion 11*e* by bringing an electrode (not shown) of an arc welding machine close to the tip 31*c*. The angle between the respective slanted portions 31*b* of the welding construction 30 differs from the one between the slanted portions 11*b* of the above embodiments. A proper range T also differs from that of the above embodiments and the electrode is positioned within the proper range T defined based on the shape of the welding construction 30.

With reference to FIG. 5(B), the molten material of the meltable portion 11*e* substantially coats or surrounds the lead 12*a* and substantially fills the slit 11*d* to electrically connect the lead 12*a* and the weldable portion 11*a* and to fix the lead 12*a* to the weldable portion 11*a*.

In this way, the lead 12*a* can be arc-welded to the weldable portion 11*a* similar to the above embodiments, even though the tip 31*c* is displaced from the widthwise center of the weldable portion 11.

The center of the substantially circular cross section of the lead 12*a* is displaced slightly to right from the straight line L extending vertically from the tips 11*c*, 31*c* in the second and third embodiments. However, even if this center is slightly displaced to left, the lead 12*a* and the weldable portion 11*a* can be arc-welded as in the above embodiments if the meltable portion 11*e* is set to have a volume or geometric dimension sufficient to close the opening of the slit 11*d*.

Although the welding constructions 10 to 30 are adopted to weld the lead 12*a* of the fuse 12 in the foregoing embodiments, they may be adopted to arc-weld leads of other electric or electronic devices or may be adopted generally to weld terminals connected with wires by, e.g. crimping, soldering, insulation displacement or the like or also can be used to physically connect two parts which need not be connected electrically.

As described above, the tip is at the leading end of the electrically conductive plate according to the present invention. Thus, arcs created toward the leading end of the electrically conductive plate can be directed toward or close to the tip. The arc directed toward the tip creates heat energy at the tip to melt the meltable portion. The meltable portion and the slit are next to each other in the electrically conductive plate. Thus, the molten material of the meltable portion substantially fills the slit to coat the lead in the slit. The lead and the electrically conductive plate can be arc-welded by creating the arcs at the leading end of the electrically conductive plate.

Thus, according to the inventive welding construction and welding method, arcs can be created reliably at the desired position and the electronic device and the electrically conductive plate are arc-welded with reproducibility without damaging the electronic device.

The invention is not limited to the above described and illustrated embodiment. For example, the following embodiments are also embraced by the technical scope of the present invention as defined by the claims. Beside the following embodiments, various changes can be made without departing from the scope and spirit of the present invention as defined by the claims.

In the foregoing embodiments, the tip is formed by two slanted edges that intersect each other. However, it should be understood that the tip may be formed by only one slanted edge intersecting a vertical edge of the weldable portion (refer to FIGS. 6(A) and 6(B)). In the embodiment shown in FIGS. 6(A) and (B), the slit 11*d* is formed in a substantially vertical portion of the weldable portion 11*a* to extend in approximately to the widthwise center thereof, wherein the weldable portion 11*a* is shaped to have the tip 11*c* by means of a slanted portion 11*b* (which may be substantially straight, as shown, or slightly curved or rounded). The weldable portion 11*a* of the embodiment depicted in FIGS. 6(A) and (B) is welded or melted by approaching the electrode D to the tip 11*c* to generate a welding-arc. Thus, the melted portion 11*e* is melted and surrounds the lead 12*a* so as to lock, hold and electrically contact the lead 12*a* (see FIG. 6(B)).

Figures 6A, 6B, 6C, 6D:
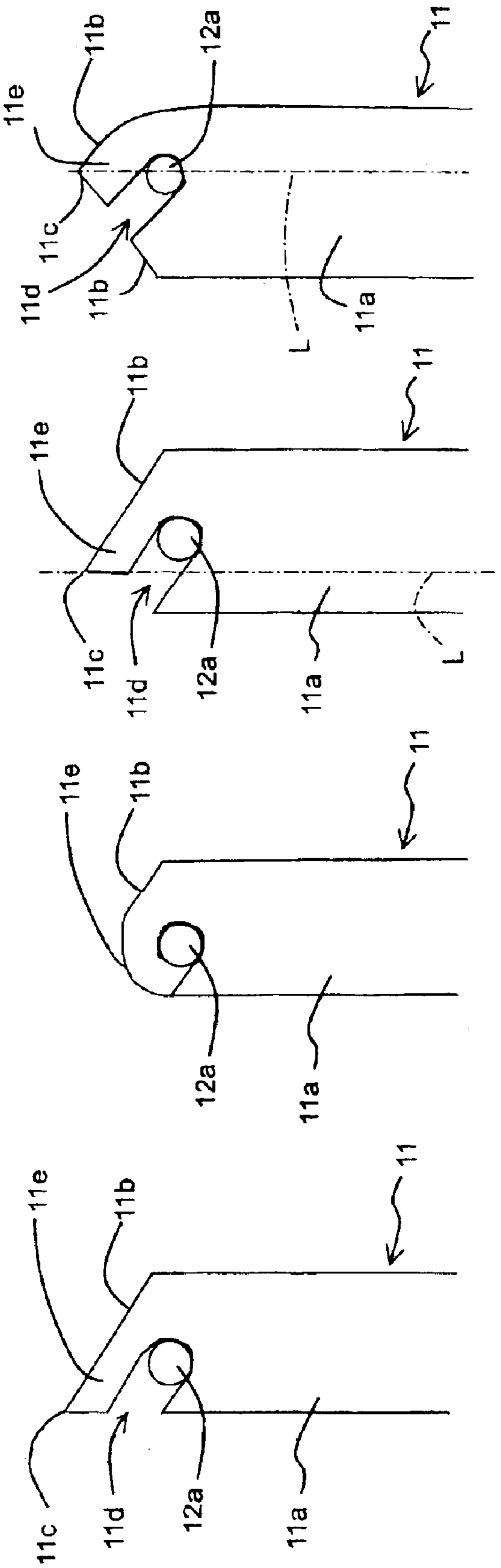
Figure 7A:
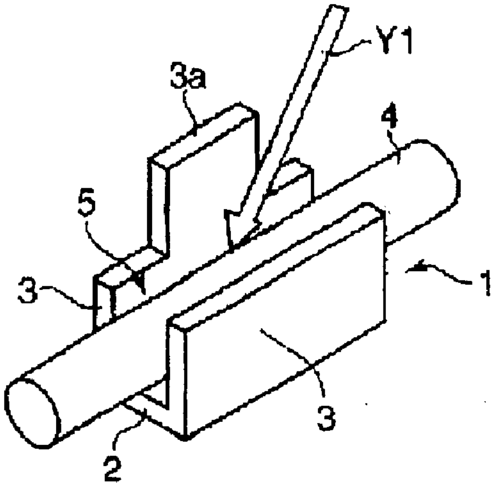
FIG. 7(A) PRIOR ART
Figure 7B:
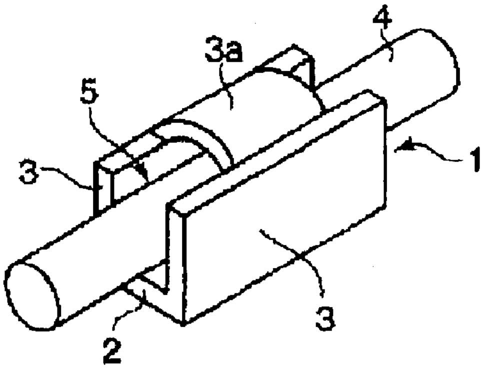
FIG. 7(B) PRIOR ART
Figure 8:
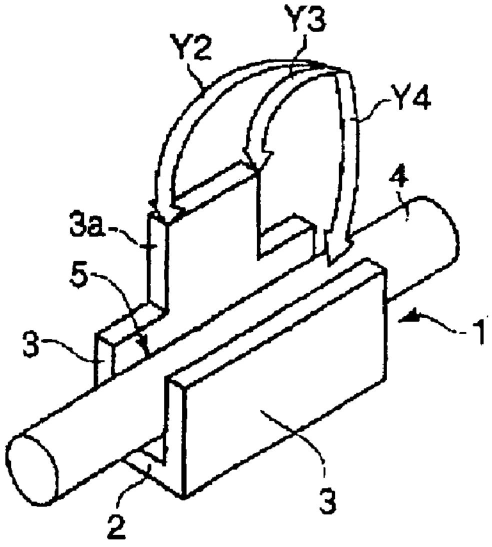
FIG. 8 PRIOR ART
FIG. 8 is a perspective view showing a state where the beam-weldable terminal construction of FIG. 7 and a wire are connected by arc welding with a part of the beam-weldable terminal construction left out.

The slit 11*d* may be formed in a substantially vertical edge of the weldable portion 11*a*, as shown in FIG. 6(C) and the meltable portion 11*e* may be shortened so as to displace the tip portion 11*c* more towards the widthwise center of the weldable portion 11*a*. Accordingly, the lead 12*a* may be arranged in the slit 11*d* beyond the substantially vertical ideal line L passing through the tip 11*c*.

In the foregoing embodiments, the slanted edges start from substantially the same height on a weldable portion 11*a*. However, the slanted edges could start from different heights on a weldable portion 11*a* according to the invention (refer e.g. to FIG. 6(D)).

In the foregoing embodiments, the slanted edges are substantially straight and are arranged at an angle to the vertical. However, at least one slanted edge may be non-straight, such as a bent edge gradually bending away from the respective vertical edge of the weldable portion to form the tip of the invention (see FIG. 6(D)).

In the foregoing embodiments, the slit is formed in one of the slanted edges. However, the slit may be formed in a vertical edge, provided that the tip portion is above the slit so that the melted meltable portion can at least partly cover or surround the lead of the electric/electronic part (refer to FIGS. 6(A) and (B)).

The slit may have any angle with respect to the lateral portion where it is formed, provided the angle allows a slit that is sufficiently deep to allow the melted meltable portion to substantially cover or surround the lead.

In the foregoing embodiments, the tip is formed by a pair of intersecting slanted edges. However, the tip does not need to have an acute or obtuse angle, but may be rounded or otherwise pointed provided that it has a curvature to cause the welding arc to be generated at or near the pointed portion. Accordingly, a rounded tip with a small curvature (such as a tip with a curvature radius of about 2 mm) is possible.

What is claimed is:

1. A welding method for arc-welding a lead of a device to an electrically conductive plate, comprising:

providing a welding construction having first and second slanted edges formed to narrow and taper a leading end of the electrically conductive plate along a widthwise direction, such that the slanted edges defines a tip at the leading end of the electrically conductive plate, forming a slit extending into the first slanted edge at a location offset from the tip and continuing at least toward a widthwise center of the electrically conductive plate and dimensioned to accommodate the lead, a meltable portion being defined between the slit and the second slanted edge of the electrically conductive plate including the tip, the meltable portion having a volume necessary to substantially close an opening of the slit;

inserting the lead into the slit; and performing a welding step so that arcs are created at the leading end of the electrically conductive plate to melt the meltable portion so that a molten material of the meltable portion is filled into the slit and substantially around the lead.

2. The welding method of claim 1, wherein the welding construction is formed such that the slit extends from said slanted edge beyond a widthwise center of the electrically conductive plate.

3. The welding method of claim 1, further comprising placing the lead in the slit at least to an imaginary line extending substantially vertically from the tip along the leading end of the electrically conductive plate.

4. A welding method or arc-welding a lead of a device to an electrically conductive plate, comprising:

providing a welding construction having at least one slanted edge formed to narrow and taper a leading end of the electrically conductive plate along a widthwise direction, such that the slanted edge defines a tip at the leading end of the electrically conductive plate, forming a slit extending at least toward a widthwise center of the electrically conductive plate and dimensioned to accommodate the lead, a meltable portion being defined between the slit and the leading end of the electrically conductive plate including the tip, the meltable portion having a volume necessary to substantially close an opening of the slit;

inserting the lead into the slit; and performing a welding step so that arcs are created at the leading end of the electrically conductive plate to melt the meltable portion, so that a molten material of the meltable portion is filled into the slit and substantially around the lead, wherein the welding step comprises arranging an electrode within a proper range (T), which is a substantially pentagonal area defined by a first side connecting a reference point located about 0.2 mm right and about 0.2 mm up from the tip and a position about 0.5 mm right and about 0.5 mm down from the reference point, a second side connecting a bottom end of the first side and a position about 0.1 mm right and about 0.5 mm up from the bottom end of the first side, a third side connecting an upper end of the second side and a position about 0.6 mm up from the upper end of the second side, a fourth side connecting an upper end of the third side and a position about 0.6 mm left from the upper end of the third side, and a fifth side connecting a left end of the fourth side and the reference point.

5. The welding method of claim 4, wherein the step of providing a welding construction comprises forming two slanted edges, the tip being formed at an intersection of the slanted edges.

6. The welding method of claim 4, wherein the electrode is permitted to make movement errors within a range of at minimum about ±0.2 mm along longitudinal and transverse directions with respect to the proper range.

7. The welding method of claim 1, wherein the slit has a closed end spaced from the second slanted edge, the step of inserting the lead into the slit comprising inserting the lead into contact with the closed end of the slit.

8. The welding method of claim 1, wherein the welding step includes melting the meltable portion sufficiently so that portions of the lead in the slit are completely surrounded by the welding construction, including the molten material of the meltable portion.

9. The welding method of claim 1, wherein the welding step is carried out with a welding electrode spaced a selected distance from the welding construction.

* * * * *